United States Patent [19]

Borne

[11] Patent Number: 5,242,196
[45] Date of Patent: Sep. 7, 1993

[54] THREE COMPARTMENT TRAILER

[75] Inventor: Clyde R. Borne, Gonzales, La.

[73] Assignee: Ethyl Corporation, Richmond, Va.

[21] Appl. No.: 678,459

[22] Filed: Apr. 1, 1991

[51] Int. Cl.$^5$ .................................................. B60P 3/24
[52] U.S. Cl. ................................. 280/830; 105/359;
    220/461; 220/DIG. 24; 280/832; 280/837;
    280/838
[58] Field of Search ............... 280/830, 832, 837, 838,
    280/839; 137/1; 141/1; 220/452, 453, 454, 457,
    461, DIG. 24; 105/359

[56]  References Cited
        U.S. PATENT DOCUMENTS

| | | | |
|---|---|---|---|
| 1,844,530 | 2/1932 | Thwaits | 220/DIG. 24 |
| 2,056,820 | 10/1936 | Bradley et al. | 220/563 |
| 2,057,999 | 10/1936 | Bowlby | 220/457 |
| 2,098,577 | 11/1937 | Gredell | 220/563 |
| 2,311,004 | 2/1943 | Thomas et al. | 220/457 |
| 2,419,915 | 4/1947 | Priest et al. | 220/454 |
| 2,630,236 | 3/1953 | Arkoosh | 280/830 |
| 2,723,862 | 11/1955 | Dalgish | 280/831 |
| 2,908,419 | 10/1959 | Talmey et al. | 220/453 |
| 3,054,525 | 4/1960 | Silvis | 220/452 |
| 3,310,070 | 3/1967 | Black | 137/637.1 |
| 3,615,999 | 10/1971 | Basier | 156/172 |
| 3,889,701 | 6/1975 | Mueller | 280/838 |

FOREIGN PATENT DOCUMENTS 1214541  2/1986  U.S.S.R. .......................... 280/838

OTHER PUBLICATIONS

Brochure entitled Hydrobromic Acid BC-7 (1185) published by Ethyl Corporation (1985).

Primary Examiner—Mitchell J. Hill
Attorney, Agent, or Firm—David E. LaRose

[57]  ABSTRACT

A tank trailer assembly for transporting liquid bromine and hydrobromic acid which comprises an elongated substantially cylindrical container having three inner containers for transporting fluids. Two of the inner containers are internally lined with a poly(vinylidene fluoride) plastic material and the third container is internally lined with material that is chemically resistance to bromine.

18 Claims, 1 Drawing Sheet

5,242,196

THREE COMPARTMENT TRAILER

BACKGROUND

This invention relates to a three compartment trailer apparatus and method for transporting bromine and hydrobromic acid.

Until now, the three compartment trailer assemblies utilized in the transportation of bromine and hydrobromic acid have utilized a rubber lining for those compartments exposed to hydrobromic acid. The rubber lining, while generally suitable for hydrobromic acid, is subject to attack from organic materials which may contaminate the hydrobromic acid from time to time as the acid is transported from one location to another. Hence there is a need for a three compartment trailer which is resistant to chemical attack from either hydrobromic acid or contaminants present in the hydrobromic acid.

SUMMARY OF THE INVENTION

The present invention provides a trailer assembly for transporting bromine or hydrobromic acid which comprises:
 a) an elongated substantially cylindrical container defining an interior having a horizontal longitudinal axis, a rear wheel assembly positioned beneath one end of the container, and towing means attached to the opposite end of the container;
 b) a first inner container positioned in one end of the interior of the elongated container having a means for discharging and filling;
 c) a second inner container positioned in a second end of the interior of the elongated container and having a means for discharging and filling; and
 d) a third inner container positioned between the first and second containers in the interior of the elongated container and having a means for discharging and filling;
wherein the first and second inner containers are internally lined with a poly(vinylidene flouride) plastic material and the third inner container is internally lined with a material chemically resistant to bromine.

Use of the tank trailer assembly of this invention having the first and second inner containers lined with a poly(vinylidene fluoride) plastic material provides, for the first time, a trailer assembly for transporting bromine to a second location from a first location, and for transporting hydrobromic acid from the second location to the first location while lessening the potential for deterioration of the hydrobromic acid lined container due to organic impurities in the acid.

DRAWINGS

FIG. 1 is a side view, not to scale, of an illustrative example of the tank trailer assembly of this invention.

DETAILED DESCRIPTION OF THE INVENTION

Figure 1:
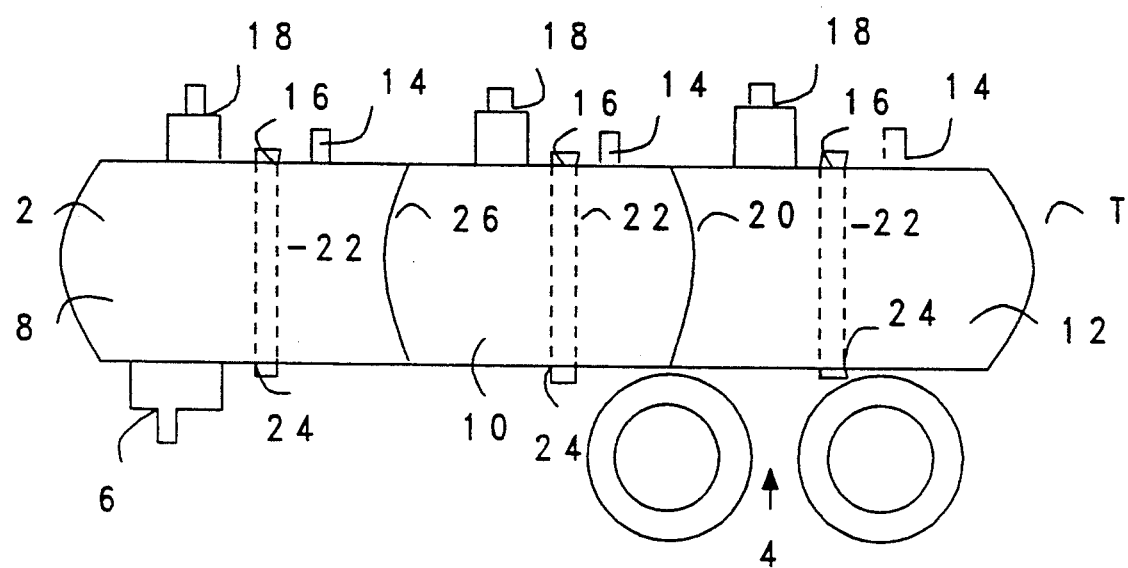

Referring now to FIG. 1, T illustrates the trailer assembly which includes an elongated substantially cylindrical container 2 supported at is rear end by a pair of double wheels 4 and which is supported at its front end by a truck or other suitable vehicle (not shown). The trailer T may be connected to a truck or vehicle by any suitable means, such as a standard fifth wheel connector 6 of the type illustrated. The first interior container 8, second interior container 12, and third interior container 10 are positioned in the elongated container 2 in preferably a substantially longitudinal alignment. The first inner container 8 is partitioned from the third inner container 10 by means of a liquid-proof Wall 26 hereinafter referred to as a head. The second inner container 12 is partitioned from the third inner container by means of head 20. The first, second and third internal containers are each provided with a means for discharging and filling 16, preferably positioned vertically above a dip tube 22 and a sump 24, preferably a means for venting and pressurizing 14, and preferably a pressure relief means 18 which are generally illustrated in the FIG. 1.

The first 8 and second interior containers 12 are utilized in the transportation of the aqueous hydrobromic acid and are therefore internally lined with a material which is chemically resistant to hydrobromic acid. Such lining materials may include, rubber, both natural and synthetic, fiberglass-reinforced plastics, ceramics and poly(vinylidene fluoride) resins. In a highly preferred embodiment of the invention, the interior of the hydrobromic acid transporting containers is lined with a poly(vinylidene fluoride) lining, e.g. Kynar ® lining. This lining material not only resists attack from hydrobromic acid per se, but is resistant to hydrobromic acid which may be contaiminated with organic compounds.

The third container is utilized in the transport of bromine and is therefore comprised of a material which is chemically resistant to bromine. Such material may include clad steel or lined carbon steel. Examples of cladding materials include nickel; nickel alloys selected from nickel/chromium alloys, and nickel/copper alloys. Lining materials which may be used include lead and fluoropolymers. In a highly preferred embodiment, the interior of the third compartment is ASTMB 162 Ni 200 nickel alloy clad steel.

In the preferred method of operation and use, the trailer assembly is loaded with either bromine or hydrobromic acid and is then transported for delivery to the desired location, which is many remote from the location where the trailer is loaded. After the bromine or hydrobromic acid is unloaded form the trailer assembly, preferably by means of pressurizing the appropriate inner container, the trailer assembly is then loaded, sometimes at the same location, with bromine and hydrobromic acid (whichever chemical was not originally transported) and transported to the location desiring the now loaded material. The transported location is oftentimes the original location point.

The size of the trailer T and the inner containers s, 10 and 12 may be varied as desired, generally being governed by applicable laws and the size of the loads. The means for venting and pressurizing 14, the means for filling and discharging 16 and the pressure relief means 18, and their specific arrangement may be varied as desired without departing from the scope of the invention. The total volume of containers 8 and 12 is preferably about twice the volume of container 10 in order to maintain proper weight distribution.

Preferably, the volume of the first inner container is in the range of from about 75 to about 125 percent by volume of the second inner container and, more preferably, the volumes are about equal. Volumes in this range provide a preferable weight distribution in the trailer assembly during the transportation of the hydrobromic acid to its desired location.

In a preferred embodiment of the present invention, the first and second inner compartments each have a volume of about 1690 gallons and the third inner compartment has a volume of 1615 gallons. Volumes in these amounts allow the delivery of about 42,000 pounds of bromine or hydrobromic acid.

The foregoing description of the invention is illustrative of the invention and various changes in the size and shape of the container, as well as in the details of the illustrated construction, may be made within the scope of the appended claims without departing from the spirit and scope thereof.

What is claimed is:

1. A tank trailer assembly for transporting liquid bromine and hydrobromic acid comprising:
   a) an elongated substantially cylindrical container defining an interior having a horizontal longitudinal axis, a rear wheel assembly positioned beneath one end of said container, and towing means attached to the opposite end of said container;
   b) a first inner container positioned in one end of the interior of said elongated container having a means for discharging and filling;
   c) a second inner container positioned in a second end of the interior of said elongated container and having a means for discharging and filling; and
   d) a third inner container positioned between said first and second containers in the interior of said elongated container and having a means for discharging and filling;
   wherein said first and second inner containers are internally lined with a poly(vinylidene flouride) plastic material and said third inner container is internally lined or clad with a material chemically resistant to bromine.

2. The tank trailer assembly of claim 1 wherein said third inner container is steel clad with nickel, or a nickel alloys selected from nickel/chromium alloys, and nickel/copper alloys.

3. The tank trailer assembly of claim 1 wherein said first and second inner containers are of approximately equal capacity.

4. The tank trailer assembly of claim 1 wherein the total combined volume of said first and second inner containers is about twice the volume of said third inner container.

5. The tank trailer assembly of claim 2 wherein said first and second inner containers are of approximately equal capacity.

6. The tank trailer assembly of claim 5 wherein the total combined volume of said first and second inner containers is about twice the volume of said third inner container.

7. A method of transporting bromine and hydrobromic acid in a tank trailer assembly comprising:
   a) an elongated substantially cylindrical container defining an interior having a horizontal longitudinal axis, a rear wheel assembly positioned beneath one end of said container, and towing means attached to the opposite end of said container;
   b) a first inner container positioned in one end of the interior of said elongated container having a means for discharging and filling;
   c) a second inner container positioned in a second end of the interior of said elongated container and having a means for discharging and filling; and
   d) a third inner container positioned between said first and second containers in the interior of said elongated container and having a means for discharging and filling;
   wherein said first and second inner containers are internally lined with a poly(vinylidene flouride) plastic material and said third inner container is internally lined or clad with a material chemically resistant to bromine;
   i) loading said third inner container at a first location with bromine;
   ii) transporting said tank trailer assembly to a second location;
   iii) unloading said bromine at said second location;
   iv) loading said first and second inner containers with hydrobromic acid at said second location; and
   v) transporting said hydrobromic acid back to said first location.

8. The method of claim 7 wherein said third inner container is steel clad with nickel, or a nickel alloys selected from nickel/chromium alloys, and nickel/copper alloys.

9. The method of claim 7 wherein said first and second inner containers are of approximately equal capacity.

10. The method of claim 7 wherein the total combined volume of said first and second inner containers is about twice the volume of said third inner container.

11. The method of claim 8 wherein said first and second inner containers are of approximately equal capacity.

12. The method of claim 11 wherein the total combined volume of said first and second inner containers is about twice the volume of said third inner container.

13. A method of transporting bromine and hydrobromic acid in a tank trailer assembly comprising:
   a) an elongated substantially cylindrical container defining an interior having a horizontal longitudinal axis, a rear wheel assembly positioned beneath one end of said container, and towing means attached to the opposite end of said container;
   b) a first inner container positioned in one end of the interior of said elongated container having a means for discharging and filling;
   c) a second inner container positioned in a second end of the interior of said elongated container and having a means for discharging and filling; and
   d) a third inner container positioned between said first and second containers in the interior of said elongated container and having a means for discharging and filling;
   wherein said first and second inner containers are internally lined with a poly(vinylidene flouride) plastic material and said third inner container is internally lined or clad with a material chemically resistant to bromine;
   i) loading said first and second inner containers at a first location with hydrobromic acid;
   ii) transporting said tank trailer assembly to a second location;
   iii) unloading said hydrobromic at said second location;
   iv) loading said third inner container with bromine at said second location; and
   v) transporting said bromine back to said first location.

14. The method of claim 13 wherein said third inner container is steel clad with nickel, or nickel alloys selected from nickel/chromium alloys, and nickel/copper alloys.

15. The method of claim 13 wherein said first and second inner containers are of approximately equal capacity.

16. The method of claim 13 wherein the total combined volume of said first and second inner containers is about twice the volume of said third inner container.

17. The method of claim 14 wherein said first and second inner containers are of approximately equal capacity.

18. The method of claim 17 wherein the total combined volume of said first and second inner containers is about twice the volume of said third inner container.

* * * * *